United States Patent
Bryne (10) Patent No.: US 10,182,609 B2
(45) Date of Patent: Jan. 22, 2019

(54) APERTURE COVER FOR BICYCLE CLEAT ASSEMBLY

(71) Applicant: Speedplay, Inc., San Diego, CA (US)

(72) Inventor: Richard M. Bryne, San Diego, CA (US)

(73) Assignee: Speedplay, Inc., San Diego, CA (US)

( * ) Notice: Subject to any disclaimer, the term of this patent is extended or adjusted under 35 U.S.C. 154(b) by 52 days.

(21) Appl. No.: 14/444,948

(22) Filed: Jul. 28, 2014

(65) Prior Publication Data
US 2016/0021970 A1 Jan. 28, 2016

(51) Int. Cl.
| A43B 5/18 | (2006.01) |
| A43C 15/02 | (2006.01) |
| B62M 3/08 | (2006.01) |
| A43B 5/14 | (2006.01) |

(52) U.S. Cl.
CPC ............... *A43B 5/14* (2013.01); *A43B 5/185* (2013.01); *A43C 15/02* (2013.01); *B62M 3/086* (2013.01)

(58) Field of Classification Search
CPC .......... A43B 5/14; A43B 5/185; A43C 15/02; A43C 13/00; A43C 19/00; B62M 3/086
USPC .......... 70/158, 159, 163; 215/208, 211, 235, 215/274, 305, 356
See application file for complete search history.

(56) References Cited

U.S. PATENT DOCUMENTS

| 383,133 A | * | 5/1888 | Kingston et al. | ...... A43C 13/04 36/126 |
| 550,409 A | * | 11/1895 | Hanson | .................. B62M 3/086 36/131 |
| 1,232,896 A | * | 7/1917 | Clifford | ................. A43C 15/14 36/134 |
| 1,337,938 A | * | 4/1920 | Merriam | .................. F16B 2/241 24/580.1 |
| 1,370,730 A | | 3/1921 | Carver | |
| 1,464,854 A | * | 8/1923 | Rose | ..................... B60R 25/023 292/DIG. 2 |
| 1,583,274 A | * | 5/1926 | Bostock | ............... A43B 3/0078 36/136 |
| 2,131,060 A | * | 9/1938 | Malluk | .............. B60K 15/0409 70/158 |

(Continued)

FOREIGN PATENT DOCUMENTS

| DE | 2816189 A1 | 8/1979 |
| DE | 3315282 A1 | 10/1984 |

(Continued)

OTHER PUBLICATIONS bont.com, Bont Crono, www.bont.com/cycling/pages/bontcrono.html.

(Continued)

*Primary Examiner* — Jameson Collier
*Assistant Examiner* — Jocelyn Bravo
(74) *Attorney, Agent, or Firm* — Sheppard, Mullin, Richter & Hampton, LLP (57) ABSTRACT

A bicycle cleat/cover assembly and a cover device. The bicycle cleat cover device is configured to be releasably secured to a bicycle cleat, wherein the bicycle cleat has an aperture sized and configured to receive a clipless pedal. The removable bicycle cleat cover device serves to inhibit debris from entering the central opening of the bicycle cleat when the bicycle cleat is disengaged from a pedal and the user is walking about on the ground.

3 Claims, 7 Drawing Sheets

(56) References Cited

U.S. PATENT DOCUMENTS

| | | | | |
|---|---|---|---|---|
| 2,489,368 A * | 11/1949 | Faybert | A43B 23/30 | 36/1 |
| 2,678,507 A * | 5/1954 | Dye | A43C 13/04 | 36/128 |
| 2,733,052 A * | 1/1956 | Luther | A47J 43/0727 | 215/331 |
| 2,841,658 A * | 7/1958 | Dawkins | H04M 1/667 | 379/445 |
| 3,114,982 A * | 12/1963 | McGowan | A43B 3/0031 | 36/132 |
| 3,349,947 A * | 10/1967 | Zumwalt | F16L 55/1018 | 220/327 |
| 3,354,561 A * | 11/1967 | Cameron | A43B 3/0042 | 36/128 |
| 3,551,963 A * | 1/1971 | Mosher, Jr., et al. | A44B 17/0029 | 24/618 |
| 3,707,047 A * | 12/1972 | Nedwick | A43C 15/161 | 36/114 |
| 3,759,075 A * | 9/1973 | Lipschutz | B60K 15/04 | 200/61.89 |
| 3,808,910 A * | 5/1974 | Desbois | A43B 5/14 | 74/594.6 |
| 3,816,945 A * | 6/1974 | Egtvedt | A43B 3/0042 | 36/114 |
| 3,859,867 A * | 1/1975 | Haines | B62M 3/08 | 74/563 |
| 3,860,209 A * | 1/1975 | Strecker | B60P 7/13 | 24/265 CD |
| 3,903,837 A * | 9/1975 | Barton | G09F 9/00 | 116/315 |
| 3,950,076 A * | 4/1976 | Carlson | B62J 6/20 | 301/37.41 |
| 3,998,078 A * | 12/1976 | Detwiler | B60K 15/0409 | 220/210 |
| 4,055,005 A * | 10/1977 | Meinhart | A43B 5/18 | 36/135 |
| 4,083,209 A * | 4/1978 | Sloan, Jr. | B60K 15/0409 | 220/210 |
| 4,103,797 A * | 8/1978 | Morris | B65D 50/046 | 215/209 |
| 4,132,091 A * | 1/1979 | Aro | B60K 15/0409 | 220/210 |
| 4,183,157 A * | 1/1980 | Counselman | A43B 5/185 | 36/135 |
| 4,253,698 A * | 3/1981 | Hodson | B60K 15/05 | 292/1 |
| 4,271,610 A * | 6/1981 | Parrent | A43B 5/12 | 36/136 |
| 4,298,210 A * | 11/1981 | Lotteau | A43B 5/14 | 280/11.3 |
| 4,377,952 A * | 3/1983 | Gamondes | A43B 5/14 | 36/131 |
| 4,400,856 A * | 8/1983 | Tseng | B60P 7/13 | 24/109 |
| 4,436,219 A * | 3/1984 | Reutter | B60K 15/0406 | 220/295 |
| 4,453,388 A * | 6/1984 | Baker | B60K 15/0409 | 220/210 |
| 4,469,235 A * | 9/1984 | Parker | B65D 41/0485 | 215/295 |
| 4,488,453 A | 12/1984 | Drugeon et al. | | |
| 4,599,914 A | 7/1986 | Dunn et al. | | |
| 4,599,915 A * | 7/1986 | Hlavac | B62M 3/08 | 74/594.4 |
| 4,669,204 A * | 6/1987 | Tanel | A43B 3/0042 | 36/126 |
| 4,676,390 A * | 6/1987 | Harris | B60K 15/0406 | 220/203.06 |
| 4,678,097 A * | 7/1987 | Crute | B60K 15/0406 | 138/89 |
| 4,712,319 A * | 12/1987 | Goria | A43B 1/0036 | 359/518 |
| 4,735,107 A * | 4/1988 | Winkie | A43B 5/14 | 36/131 |
| 4,739,564 A * | 4/1988 | Eser | A43B 5/14 | 36/131 |
| 4,803,894 A | 2/1989 | Howell | | |
| 4,807,372 A * | 2/1989 | McCall | A43B 5/14 | 36/131 |
| 4,815,333 A | 3/1989 | Sampson | | |
| 4,819,504 A | 4/1989 | Sampson | | |
| 4,827,633 A * | 5/1989 | Feldstein | A43B 5/14 | 36/131 |
| 4,827,797 A | 5/1989 | Le Faou et al. | | |
| 4,836,047 A * | 6/1989 | Alcamo | B62M 3/086 | 36/131 |
| 4,840,086 A | 6/1989 | Bidal | | |
| 4,898,063 A | 2/1990 | Sampson | | |
| 4,899,618 A | 2/1990 | Christol | | |
| 4,905,354 A * | 3/1990 | Smith | F16B 5/10 | 24/453 |
| 4,907,355 A * | 3/1990 | Allen | A43B 5/14 | 36/131 |
| 4,907,469 A * | 3/1990 | Gobbi | A43B 5/14 | 36/131 |
| 4,936,164 A * | 6/1990 | Forke | B62M 3/086 | 36/131 |
| 4,942,778 A | 7/1990 | Bryne | | |
| 4,982,581 A * | 1/1991 | Furuyama | A44C 17/0216 | 24/303 |
| 5,007,185 A * | 4/1991 | Lazarski | A43B 5/14 | 36/131 |
| 5,031,342 A * | 7/1991 | Crook | A43B 5/18 | 36/135 |
| 5,070,631 A * | 12/1991 | Fenton | A43C 15/16 | 36/127 |
| 5,079,968 A * | 1/1992 | Starner | A43B 3/0042 | 36/131 |
| 5,131,291 A * | 7/1992 | Beyl | A43B 5/14 | 36/131 |
| 5,195,336 A * | 3/1993 | Mershon | A44B 1/14 | 63/29.1 |
| 5,199,324 A | 4/1993 | Sain | | |
| 5,211,076 A * | 5/1993 | Baume | B62M 3/086 | 36/131 |
| 5,213,009 A * | 5/1993 | Bryne | B62M 3/086 | 74/594.4 |
| 5,251,508 A * | 10/1993 | Robbins | A43B 5/14 | 36/131 |
| 5,269,200 A * | 12/1993 | Hawkins | B62M 3/086 | 36/131 |
| 5,284,066 A * | 2/1994 | Weiss | B62M 3/086 | 36/131 |
| 5,321,995 A | 6/1994 | Zedan | | |
| 5,325,738 A * | 7/1994 | Bryne | B62M 3/086 | 36/131 |
| 5,355,698 A * | 10/1994 | Edmark | A44C 17/0216 | 63/29.1 |
| 5,363,573 A | 11/1994 | Kilgore et al. | | |
| 5,368,427 A * | 11/1994 | Pfaffinger | F16B 21/04 | 24/580.1 |
| 5,371,903 A | 12/1994 | Lew | | |
| 5,392,537 A * | 2/1995 | Goldberg | A43B 3/0042 | 36/115 |
| 5,395,004 A * | 3/1995 | Griffin | B60K 15/0406 | 220/293 |
| 5,406,647 A | 4/1995 | Lew | | |
| 5,449,086 A * | 9/1995 | Harris | B60K 15/0406 | 220/288 |
| 5,473,963 A * | 12/1995 | Aeschbach | A43B 1/0054 | 36/131 |
| D370,451 S * | 6/1996 | Chatten | D12/197 | |
| 5,546,829 A * | 8/1996 | Bryne | B62M 3/08 | 36/131 |
| 5,553,516 A * | 9/1996 | Weiss | B62M 3/086 | 36/131 |

(56) References Cited

U.S. PATENT DOCUMENTS

| | | | |
|---|---|---|---|
| 5,557,985 A * | 9/1996 | Nagano | B62M 3/086 74/594.4 |
| 5,575,184 A | 11/1996 | De Schrijver | |
| 5,606,894 A * | 3/1997 | Bryne | B62M 3/086 74/594.4 |
| 5,638,975 A * | 6/1997 | Harris | B60K 15/0409 116/200 |
| 5,657,558 A * | 8/1997 | Pohu | A43B 5/14 36/100 |
| 5,673,501 A * | 10/1997 | Mathews | A43B 23/24 36/112 |
| 5,682,689 A * | 11/1997 | Walker | A43B 3/0042 36/134 |
| 5,687,619 A * | 11/1997 | Bryne | B62M 3/086 74/594.4 |
| 5,692,323 A * | 12/1997 | Goldberg | A43B 3/0042 36/115 |
| 5,697,262 A | 12/1997 | Chen | |
| 5,704,256 A * | 1/1998 | De Lattre | A43B 1/0054 36/131 |
| 5,727,429 A | 3/1998 | Ueda | |
| 5,765,450 A | 6/1998 | Kruger et al. | |
| 5,778,739 A | 7/1998 | Takahama | |
| 5,784,931 A * | 7/1998 | Ueda | B62M 3/086 74/594.4 |
| 5,791,507 A * | 8/1998 | Harris | B60K 15/0406 220/203.26 |
| 5,794,806 A * | 8/1998 | Harris | B60K 15/0406 220/203.24 |
| 5,806,379 A * | 9/1998 | Nagano | B62M 3/086 36/131 |
| 5,852,955 A * | 12/1998 | Crisick | B62M 3/086 74/594.4 |
| 5,860,330 A | 1/1999 | Code et al. | |
| 5,862,716 A * | 1/1999 | Bryne | B62M 3/086 74/594.4 |
| 5,904,057 A * | 5/1999 | Abney, III | B60K 15/0409 220/203.26 |
| 5,916,332 A * | 6/1999 | Chen | B62M 3/086 74/594.4 |
| D413,711 S | 9/1999 | Hicks, Jr. | |
| 5,960,568 A * | 10/1999 | Bell | A43C 15/168 36/134 |
| 6,003,408 A | 12/1999 | Hervig | |
| 6,012,203 A * | 1/2000 | Baron Pearson | A41D 27/08 24/108 |
| 6,014,914 A | 1/2000 | Ueda | |
| 6,035,559 A * | 3/2000 | Freed | A43B 3/0042 36/115 |
| 6,056,624 A * | 5/2000 | Fildan | A41C 3/0007 24/114.9 |
| 6,070,493 A | 6/2000 | Chen | |
| 6,095,363 A * | 8/2000 | Harris | B60K 15/0406 220/203.24 |
| 6,108,944 A * | 8/2000 | Savoie | A43C 15/161 220/293 |
| 6,128,973 A | 10/2000 | Nagano | |
| 6,151,989 A * | 11/2000 | Ueda | B62M 3/086 36/131 |
| 6,179,148 B1 * | 1/2001 | Harris | B60K 15/0406 220/288 |
| 6,189,913 B1 * | 2/2001 | Morrow | A43B 5/0401 280/14.21 |
| 6,196,569 B1 * | 3/2001 | Berger | A63C 10/10 280/14.21 |
| 6,205,885 B1 | 3/2001 | Hermansen et al. | |
| 6,237,797 B1 * | 5/2001 | Hurford | B60K 15/0406 220/212.5 |
| 6,244,136 B1 | 6/2001 | Chen | |
| 6,308,852 B1 * | 10/2001 | Hagano | B60K 15/0406 220/293 |
| 6,309,010 B1 | 10/2001 | Whitten | |
| 6,325,233 B1 * | 12/2001 | Harris | B60K 15/0406 220/288 |
| 6,331,007 B1 * | 12/2001 | Bryce | A43B 5/00 280/11.3 |
| 6,332,281 B1 * | 12/2001 | Savoie | A43C 15/161 24/DIG. 53 |
| 6,425,304 B1 | 7/2002 | Bryne | |
| 6,446,529 B1 | 9/2002 | Tanaka | |
| 6,453,771 B1 | 9/2002 | Takahama et al. | |
| 6,490,948 B2 | 12/2002 | Tanaka | |
| 6,494,117 B1 * | 12/2002 | Bryne | B62M 3/086 36/132 |
| 6,581,493 B1 | 6/2003 | Gillane | |
| D481,974 S | 11/2003 | Evans | |
| 6,701,645 B1 * | 3/2004 | Forrester | A43B 3/0042 36/126 |
| 6,745,914 B2 * | 6/2004 | Hagano | B60K 15/0406 220/203.24 |
| 6,763,966 B2 * | 7/2004 | Harris | B60K 15/0406 220/293 |
| 6,855,023 B2 * | 2/2005 | Berger | A63C 10/10 280/607 |
| 7,013,754 B2 | 3/2006 | Milanowski | |
| 7,017,445 B2 * | 3/2006 | Bryne | B62M 3/086 74/560 |
| 7,107,708 B2 * | 9/2006 | Kelly | A43C 15/161 36/127 |
| 7,174,807 B2 | 2/2007 | Bryne | |
| 7,322,259 B2 | 1/2008 | De Bast et al. | |
| 7,383,646 B2 | 6/2008 | Hall | |
| 7,395,584 B2 * | 7/2008 | Khalifa | H01R 13/28 24/590.1 |
| RE40,460 E * | 8/2008 | Savoie | A43C 15/161 24/450 |
| 7,472,498 B2 | 1/2009 | Bryne | |
| 7,533,480 B2 * | 5/2009 | Chao | A43B 5/14 36/131 |
| D595,620 S | 7/2009 | Kingsbury | |
| 7,779,560 B2 | 8/2010 | Kay | |
| 7,784,634 B2 * | 8/2010 | Yoshida | B60K 15/0406 220/288 |
| 7,856,905 B2 | 12/2010 | Hsieh | |
| 7,877,904 B2 * | 2/2011 | Bryne | A43B 5/14 36/131 |
| 8,065,933 B2 * | 11/2011 | Coderre | B62M 3/086 36/131 |
| 8,066,592 B2 * | 11/2011 | Forester | A43B 3/0031 36/132 |
| 8,069,538 B2 * | 12/2011 | Wilcox | A43B 3/0078 119/858 |
| 8,074,334 B2 * | 12/2011 | Tharp | B60K 15/0406 220/303 |
| 8,074,376 B1 * | 12/2011 | Teteriatnikov | A43B 3/0042 36/115 |
| 8,104,193 B1 * | 1/2012 | Teteriatnikov | A43B 5/12 36/115 |
| 8,231,485 B2 * | 7/2012 | Forester | A43B 3/0031 36/132 |
| 8,272,150 B2 * | 9/2012 | Bryne | A43B 5/14 36/131 |
| 8,341,855 B2 * | 1/2013 | Teteriatnikov | A43B 3/0042 36/136 |
| 8,353,253 B2 * | 1/2013 | Outland | B63B 17/00 114/201 R |
| 8,387,287 B2 | 3/2013 | Kay et al. | |
| 8,434,634 B2 * | 5/2013 | Bork | G01F 23/50 116/228 |
| D683,665 S | 6/2013 | Smith | |
| 8,516,665 B2 * | 8/2013 | Clarke | A41F 1/002 24/303 |
| 8,596,101 B2 * | 12/2013 | Beaudoin | B60K 15/0409 215/207 |
| 8,613,578 B2 * | 12/2013 | Hutchinson | A44B 13/0076 410/106 |
| 8,683,831 B2 * | 4/2014 | Trempala | F16L 55/11 137/283 |

(56) References Cited

U.S. PATENT DOCUMENTS

| | | | |
|---|---|---|---|
| 8,740,002 B2* | 6/2014 | Ripberger, Jr. | B60K 15/0406 116/100 |
| 8,745,900 B2* | 6/2014 | Bryne | A43B 5/14 36/131 |
| 8,771,157 B2* | 7/2014 | Caponigro | A63B 21/025 473/452 |
| 8,776,271 B2* | 7/2014 | Randolph | A41D 27/08 2/245 |
| 8,782,814 B2* | 7/2014 | Schmelzer | A43B 3/0078 2/1 |
| 8,857,292 B2* | 10/2014 | Bryne | B62M 3/086 74/594.6 |
| 8,870,030 B2* | 10/2014 | Demarest | B65D 83/207 222/153.14 |
| 2001/0008093 A1 | 7/2001 | Heim | |
| 2002/0144569 A1 | 10/2002 | Tanaka | |
| 2003/0051576 A1 | 3/2003 | Muraoka | |
| 2003/0173362 A1* | 9/2003 | Ishida | B60K 15/0406 220/375 |
| 2004/0129706 A1* | 7/2004 | Hagano | B60K 15/0406 220/375 |
| 2004/0187635 A1* | 9/2004 | Bryne | B62M 3/086 74/594.4 |
| 2004/0237705 A1 | 12/2004 | Conarro et al. | |
| 2004/0256392 A1* | 12/2004 | Hagano | B60K 15/0406 220/304 |
| 2005/0011896 A1* | 1/2005 | Yoshida | B60K 15/0406 220/304 |
| 2005/0121454 A1* | 6/2005 | Yoshida | B60K 15/0406 220/293 |
| 2005/0155452 A1* | 7/2005 | Frey | B62M 3/086 74/594.6 |
| 2005/0252337 A1 | 11/2005 | Chen | |
| 2005/0284253 A1 | 12/2005 | Hervig | |
| 2006/0070489 A1 | 4/2006 | Chen | |
| 2006/0201035 A1* | 9/2006 | Signori | A43B 5/14 36/131 |
| 2006/0236809 A1 | 10/2006 | Bryne | |
| 2007/0045322 A1* | 3/2007 | Hagano | B60K 15/0406 220/375 |
| 2007/0084086 A1* | 4/2007 | Bryne | A43B 5/14 36/131 |
| 2007/0164031 A1* | 7/2007 | Holz | B60K 15/0406 220/300 |
| 2007/0193402 A1 | 8/2007 | Hsieh | |
| 2008/0073352 A1* | 3/2008 | Hagano | B60K 15/0406 220/375 |
| 2009/0307879 A1* | 12/2009 | Outland | B63B 17/00 24/304 |
| 2010/0107451 A1* | 5/2010 | Kay | A43B 5/14 36/135 |
| 2010/0301632 A1* | 12/2010 | Bryne | A43B 5/14 296/180.1 |
| 2011/0138658 A1* | 6/2011 | Ueda | A43B 5/14 36/131 |
| 2011/0148631 A1* | 6/2011 | Lanham | E02D 29/14 340/540 |
| 2011/0283568 A1* | 11/2011 | Woodford | A43B 5/185 36/72 R |
| 2012/0066935 A1* | 3/2012 | Opie | A43B 5/185 36/135 |
| 2012/0103131 A1* | 5/2012 | Bryne | B62M 3/086 74/594.6 |
| 2012/0233891 A1* | 9/2012 | Woodford | A43B 5/185 36/72 R |
| 2012/0285045 A1* | 11/2012 | Tsen | A43B 5/185 36/135 |
| 2013/0312290 A1* | 11/2013 | Donald | A43B 3/16 36/131 |
| 2014/0263318 A1* | 9/2014 | Webster | B60K 15/0406 220/212.5 |
| 2015/0080781 A1* | 3/2015 | Connolly | A61F 5/0127 602/28 |

FOREIGN PATENT DOCUMENTS

| | | |
|---|---|---|
| DE | 3426103 A1 | 1/1986 |
| DE | 3149345 C2 | 1/1989 |
| DE | 202005019542 U1 | 2/2006 |
| EP | 0012097 A2 | 6/1980 |
| EP | 0015803 A2 | 9/1980 |
| EP | 0106162 A1 | 4/1984 |
| EP | 0153210 A1 | 8/1985 |
| EP | 0155114 A2 | 9/1985 |
| EP | 0293340 A2 | 11/1988 |
| EP | 0359134 A2 | 3/1990 |
| EP | 0485956 A1 | 5/1992 |
| EP | 0516013 A2 | 12/1992 |
| EP | 0619219 A1 | 10/1994 |
| EP | 0826587 A1 | 3/1998 |
| EP | 0894446 A1 | 2/1999 |
| FR | 2279607 A1 | 2/1976 |
| FR | 2518041 A1 | 6/1983 |
| FR | 2609270 A1 | 7/1988 |
| FR | 2711963 A1 | 5/1995 |
| FR | 2775424 A1 | 9/1999 |
| FR | 2932450 A1 | 12/2009 |
| JP | 64-23202 | 7/1989 |
| JP | 05111402 | 5/1993 |
| JP | H11-103902 | 4/1999 |
| JP | 2005-46629 | 2/2005 |
| TW | 368973 | 9/1999 |
| TW | 392662 | 6/2000 |
| TW | 200303278 | 9/2003 |
| TW | M293881 | 7/2006 |
| TW | I308543 | 4/2009 |
| WO | WO2004089741 | 10/2004 |

OTHER PUBLICATIONS pearlizumi.com, Pl Aero Lycra Shoe Cover, www.pearlizumi.com/product.pjp?mode=view&pc_id=50&product_id=193110.
Frog Pedal Specifications, www.speedplay.com.
Speedplay brochure.
International Search Report for International Application No. PCT/US2010/056057.
International Preliminary Report on Patentability for International Application No. PCT/US2010/056057.
European Search Report for Application No. 13190753.7-1753.
Office Action for Japanese Patent Application No. 2011-540875.

* cited by examiner

APERTURE COVER FOR BICYCLE CLEAT ASSEMBLY

FIELD OF THE INVENTION

The present invention relates generally to bicycle cleat assemblies configured for releasable securement to clipless bicycle pedals, and, more particularly, to an aperture cover configured to be releasably retained within a central opening of a bicycle cleat assembly when a user's shoe is disengaged from a clipless bicycle pedal.

BACKGROUND OF THE INVENTION

Bicycle cleat assemblies of this particular kind typically include a spring housing and an overlaying bottom plate configured to be attached to the sole of a user's shoe. The spring housing and bottom plate, together, define a central opening sized and configured to conformably receive a clipless bicycle pedal. The spring housing supports one or more spring clips adjacent to the central opening, for engaging and releasably retaining the clipless bicycle pedal.

When the cleat assembly is disengaged from a pedal and the user is walking about on the ground, the cleat assembly's bottom plate is in direct contact with the ground. Debris such as dirt, sand, mud and rocks can enter the central opening of the cleat assembly as the user walks about. Once debris enters the central opening, it can impede the spring clip's ability to accept the pedal. Eventually, the central opening can accumulate an amount of debris that prevents entirely the insertion of the pedal into the cleat assembly.

In addition to making it more difficult to insert the pedal into the cleat assembly, the presence of debris in the central opening can impede the spring clip's ability to securely engage and releasably retain the pedal. As a result, the user can have the false impression that the pedal is properly seated in the cleat assembly when in fact it is not.

The presence of debris such as sand and dirt in the central opening of the cleat assembly can also increase the rate at which the cleat assembly components wear out during engagement and disengagement of the cleat assembly and the pedal.

It should be appreciated from the foregoing description that there is a need for an improved cleat assembly that overcomes the drawbacks discussed above. Specifically, there is a need for an improved cleat assembly that inhibits debris from entering the central opening of the cleat assembly when a user's shoe is disengaged from a pedal and the user is walking about on the ground. The present invention satisfies these needs and provides further related advantages.

SUMMARY OF THE INVENTION

The present invention can be embodied in a bicycle cleat/cover assembly. In this embodiment of the invention, the assembly includes a bicycle cleat and an aperture cover. The bicycle cleat is configured to releasably engage a clipless bicycle pedal, including having an aperture for receiving at least a portion of the clipless bicycle pedal. The aperture cover of the bicycle cleat/cover assembly is sized and shaped to be received in the bicycle cleat aperture when the bicycle cleat is disengaged from the clipless bicycle pedal.

In other, more detailed features of the invention, the aperture cover of the bicycle cleat cover assembly includes a bottom portion, a collar spaced from the bottom portion along an axis, and a sidewall extending from the bottom portion to the collar. In another embodiment, the aperture cover's collar extends radially outward beyond the sidewall to form a lip.

In another embodiment of the assembly, the aperture cover further includes a pair of protrusions. Each of the protrusions has a top portion that extends axially above the lip of the aperture cover's collar. In this embodiment, the top portion of one protrusion is separated from the top portion of the other protrusion by a gap such that the pair of protrusions can frictionally retain a second pair of protrusions of a substantially identical second aperture cover that has been offset by a ninety-degree angle.

In a further aspect of the invention, the collar of the assembly's aperture cover has four segments of equal circumferential length such that each segment of the collar has two adjacent segments and one non-adjacent segment. The non-adjacent segments of the collar have substantially identical curved top surfaces. The adjacent segments of the collar have curved top surfaces that are complementary, such that the aperture cover can mate with an identical second aperture cover that has been offset by a ninety-degree angle.

In other, more detailed features of the invention, the sidewall of the assembly's aperture cover has a beveled outer surface tapering toward the bottom portion. In another embodiment of this invention, a channel is formed in the sidewall of the aperture cover. The channel starts at a cutout formed at an intersection of the sidewall and the bottom portion and extends circumferentially about a portion of the sidewall. In yet another embodiment of this invention, a protuberance is formed in the channel, the protuberance extending radially outward within the channel.

The present invention can also be embodied in a bicycle cleat cover device having a bottom portion, a collar spaced from the bottom portion along an axis, a sidewall extending from the bottom portion to the collar, and a pair of protrusions. The cover device's collar extends radially outward beyond the sidewall to form a lip. Each of the cover device's protrusions has a top portion that extends axially above the lip. In this embodiment, the top portion of one protrusion is separated from the top portion of the other protrusion by a gap such that the pair of protrusions can frictionally retain a second pair of protrusions of a substantially identical second bicycle cleat cover device that has been offset by a ninety-degree angle.

In another embodiment of the invention, the cover device's collar has four segments of equal circumferential length such that each segment of the collar has two adjacent segments and one non-adjacent segment. The non-adjacent segments of the collar have substantially identical curved top surfaces. The adjacent segments of the collar have curved top surfaces that are complementary, such that the aperture cover can mate with an identical second aperture cover that has been offset by a ninety-degree angle.

In other, more detailed features of the invention, the cover device's sidewall has a beveled outer surface tapering toward the bottom portion.

In another embodiment, a channel is formed in the sidewall of the cover device. The channel starts at a cutout formed at an intersection of the sidewall and the bottom portion and extends circumferentially about a portion of the sidewall. In a further aspect of the invention, a protuberance is formed in the channel, the protuberance extending radially outward within the channel.

Other features and advantages of the present invention should become apparent from the following description of the preferred embodiments, taken in conjunction with the accompanying drawings, which illustrate, by way of example, the principles of the invention.

DESCRIPTION OF THE PREFERRED EMBODIMENTS

With reference now to the illustrative drawings, and particularly to FIGS. 1-5, there is shown an embodiment of a cover device 10 for a bicycle cleat assembly in accordance with the invention, the cover device including a main body 14 and an actuator 16. The main body defines a longitudinal axis 18, and comprises a collar 20 and a bottom portion 22 opposite the collar, and a sidewall 24 extending axially between the collar and the bottom portion. The actuator comprises two graspable protrusions 44, 50 for use in inserting and extracting the cover device from the cleat assembly. The collar 20 extends radially outward beyond the sidewall 24 of the cover device, forming a lip 58 (best illustrated in FIGS. 2-3, 7-8).

Figure 6A:
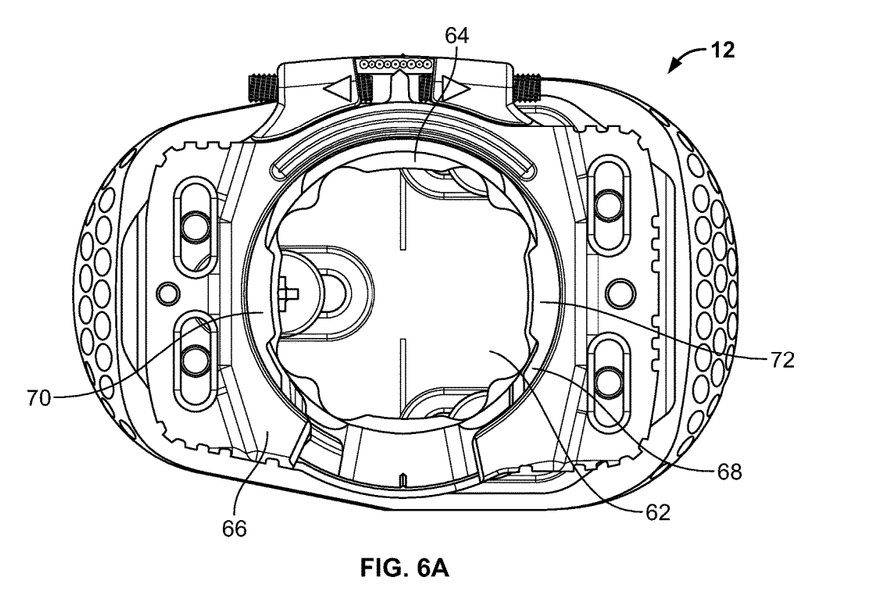
FIG. 6A is a bottom plan view of an embodiment of a cleat assembly with which the cover device of FIG. 1 can be used.
Figure 6B:
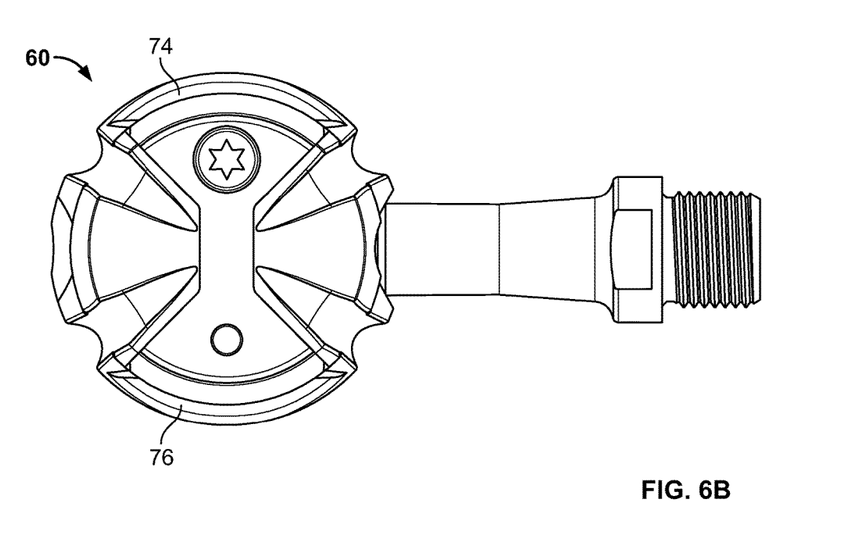
FIG. 6B is a top plan view of an embodiment of a clipless bicycle pedal with which the cleat assembly of FIG. 6A can be used.
Figure 7:
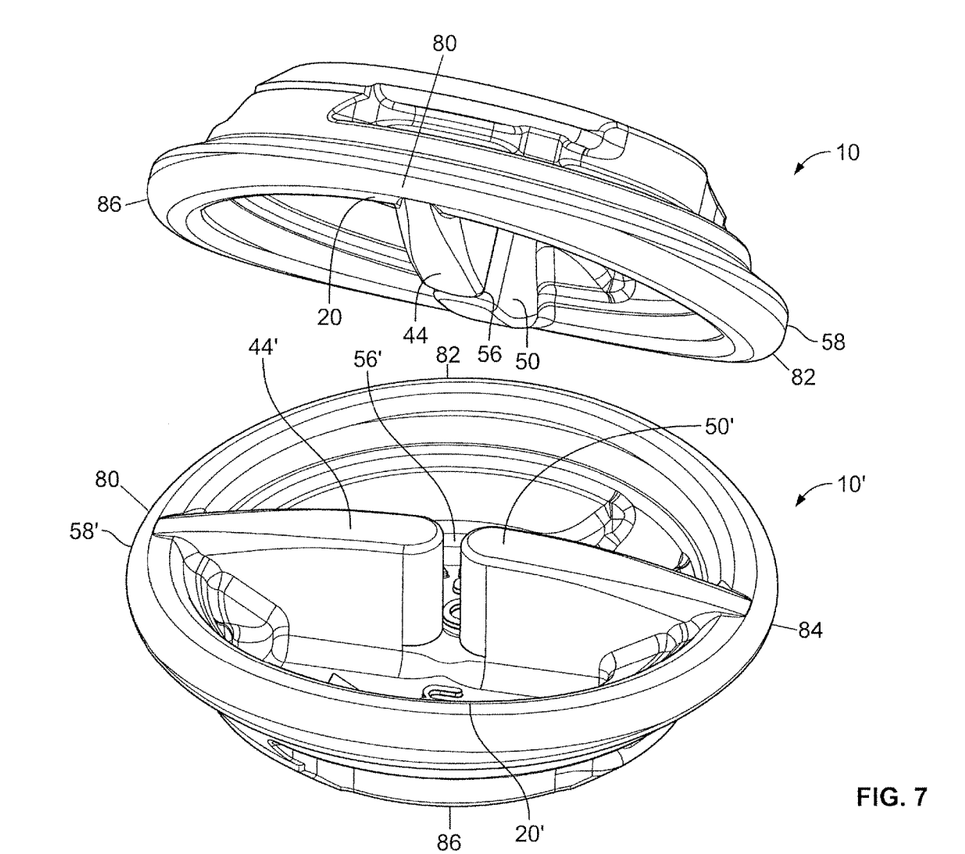
FIG. 7 is a side perspective view showing two substantially identical cover devices of the embodiment shown in FIG. 1, and illustrating the complimentary curved surfaces of the cover devices when one device is rotated 90° relative to the other.
Figure 8:
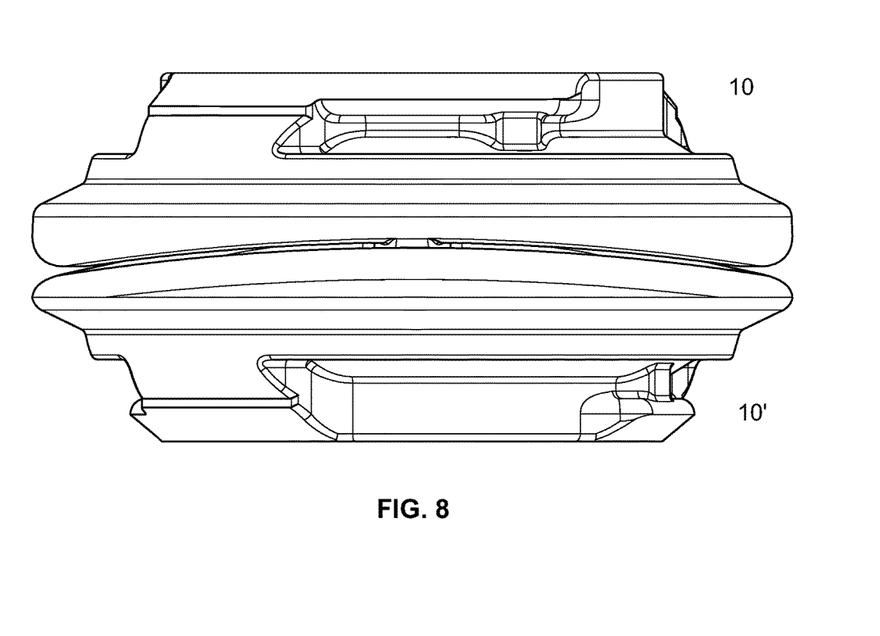
FIG. 8 is a side elevational view depicting the cover devices of FIG. 7 seated together in a mated configuration.
Figure 9:
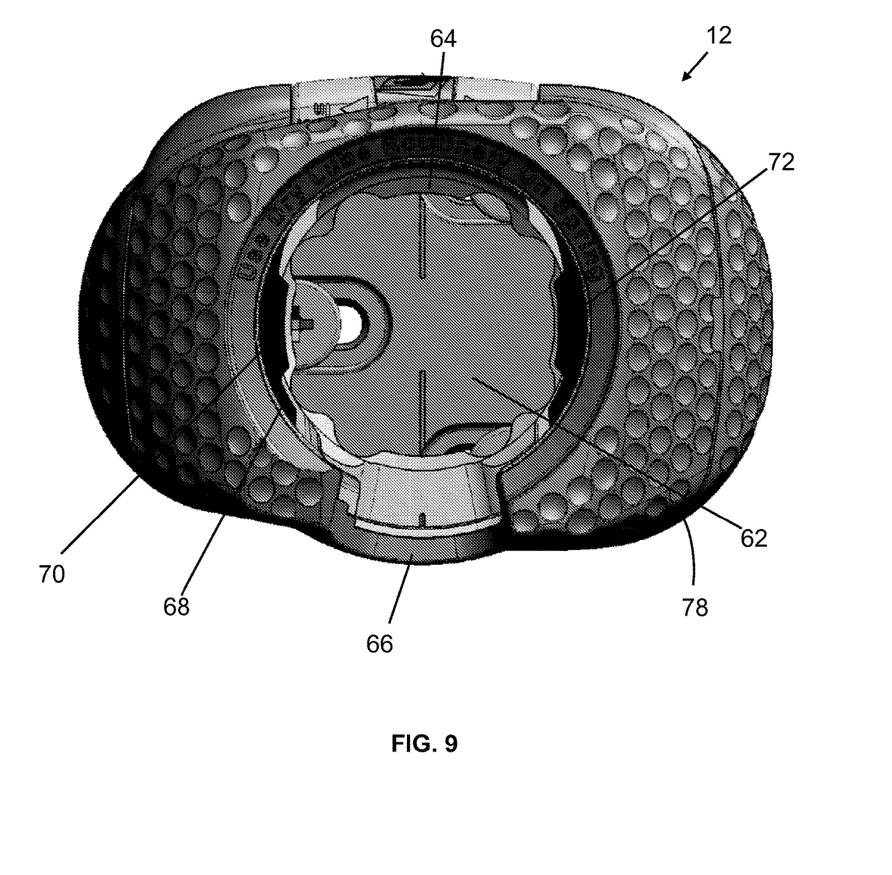
FIG. 9 is a bottom plan view of an embodiment of the cleat assembly of FIG. 6A having a bottom cover attached to the bottom plate of the cleat assembly.

The cover device 10 can be configured to be releasably secured within an aperture 34 formed in a cleat assembly 12 (FIG. 6A). The cleat assembly is configured for attachment to the sole of a user's shoe and for releasable securement to a bicycle pedal 60 (FIG. 6B). The particular cleat assembly depicted in FIG. 6A is configured for attachment to the user's left shoe, but it will be appreciated that a similar cleat assembly could be oppositely configured for attachment to the user's right shoe. The cleat assembly includes a base plate 62, a spring housing 64 and a steel bottom plate 66. An elastomeric bottom cover 78 can be attached to the bottom surface of the steel bottom plate and disposed over substantially the entire bottom surface of the bottom plate around the aperture 34 (FIG. 9). The spring housing and bottom plate, together, define the cleat assembly aperture that is sized and shaped to conformably receive the pedal. The spring housing contains a horseshoe-shaped spring clip 68 that includes a first radially inwardly extending tongue 70 and a second diametrically opposed radially inwardly extending tongue 72. The spring clip tongues 70 and 72 releasably engage complimentary shaped recesses 74 and 76 formed in the forward and rearward edges respectively of the pedal (FIG. 6B) when the pedal is fully inserted into the cleat assembly aperture.

The cleat assembly cover device depicted is sized and configured to provide a friction fit between the main body 14 and the cleat assembly aperture 34. The actuator 16 of the cover device is positioned near the collar 20, and the bottom portion 22 of the cover device comprises a leading end upon reception into the cleat assembly aperture. The cleat assembly cover device can comprise a resilient deformable material such as a molded elastomeric material (e.g., polyurethane).

Figure 1:
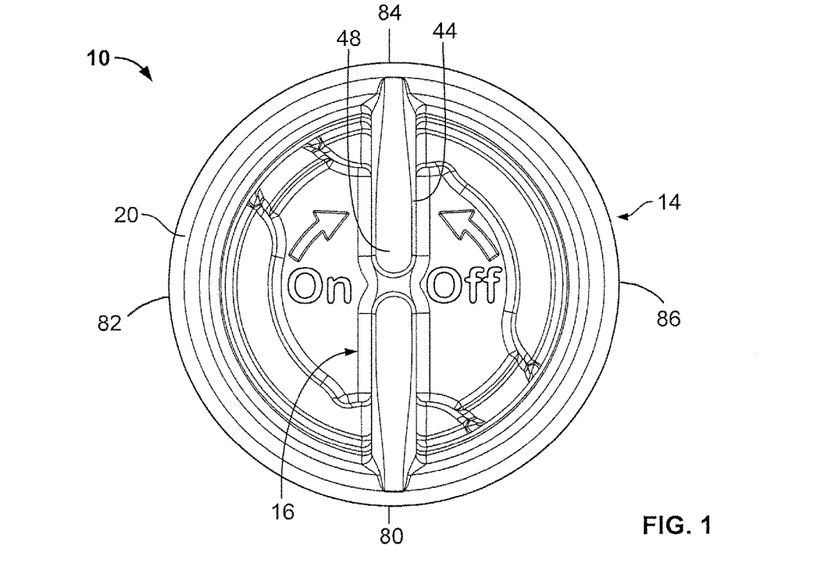
FIG. 1 is a bottom plan view of one embodiment of the present invention.
Figure 2:
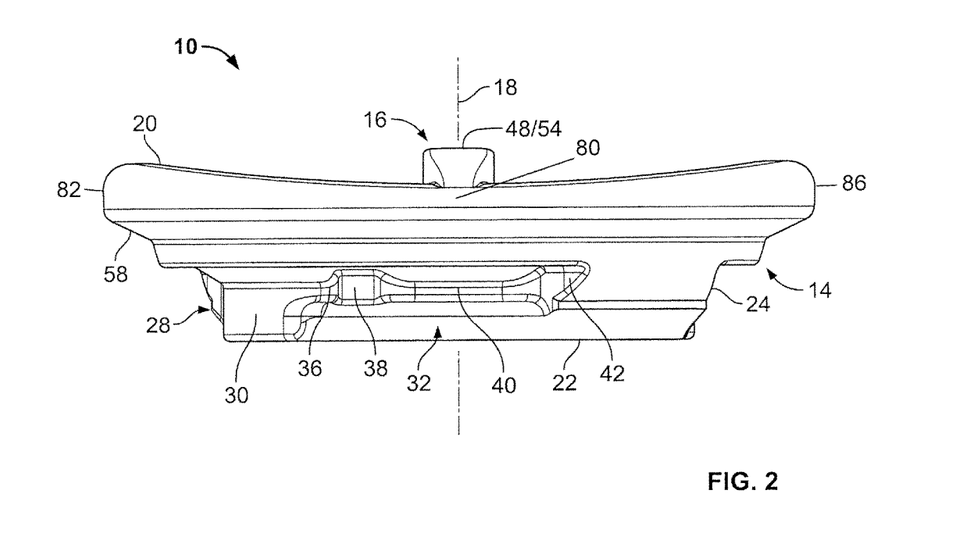
FIGS. 2 and 3 are side elevational views of the embodiment of the cover device of FIG. 1, showing the cover device in a first orientation and a second orientation respectively.
Figure 3:
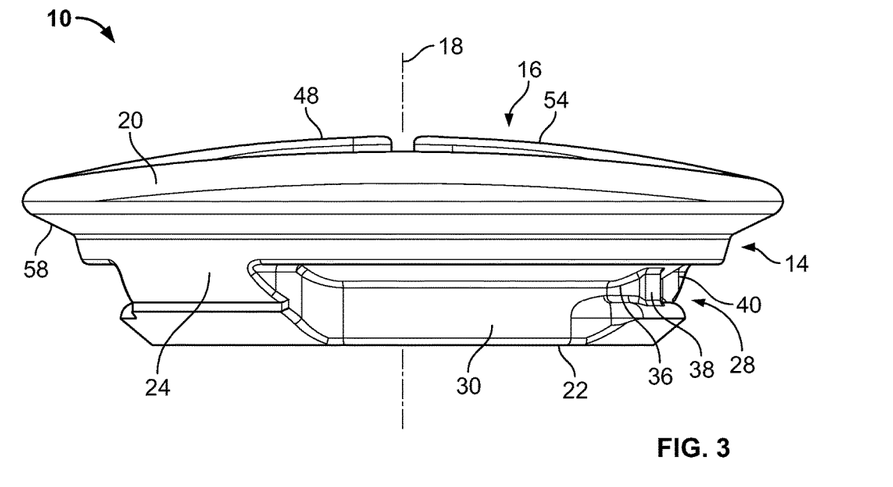
Figure 4:
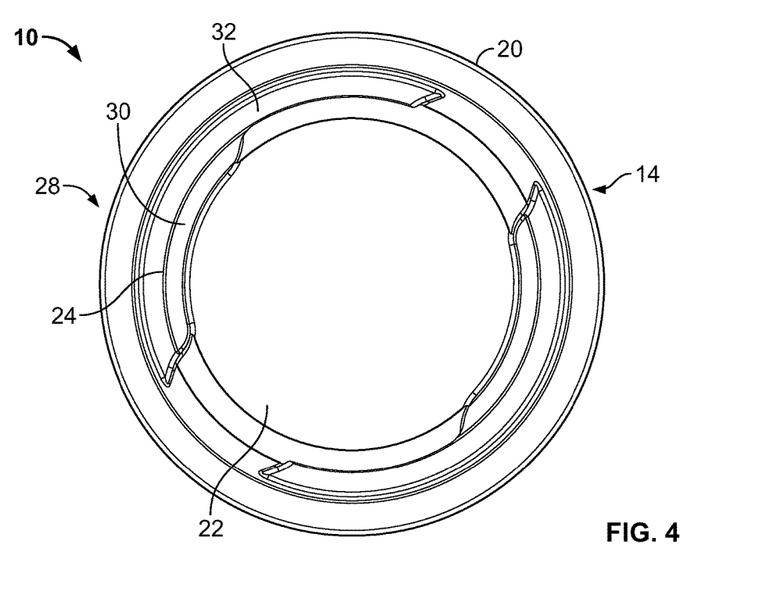
FIG. 4 is a top plan view of the embodiment of the cover device of FIG. 1.

More particularly, as illustrated in FIGS. 2 and 3, the cover device 10 further includes a receiving region 28 formed in the sidewall 24. Although not visible in FIGS. 2 and 3, the illustrated embodiment has a second identical receiving region formed in the diametrically opposed region of the sidewall. The following description is limited to just one of the two identical, and diametrically opposed, receiving regions formed in the sidewall of the cover device. The receiving region includes a cutout 30 and a channel 32. The cutout of the sidewall forms a radially inwardly extending depression beginning at the bottom portion 22 of the cover device, the cutout being shaped and configured to receive one of the spring clip's radially inwardly extending tongues 70 or 72 (FIG. 6A) when the cover device is inserted into the cleat assembly aperture. The channel is in communication with the cutout and extends circumferentially in a plane generally orthogonal to the cover device's longitudinal axis 18, the channel being shaped and configured to receive one of the spring clip's radially inwardly extending tongues 70 or 72 upon angular rotation of the cover device about its longitudinal axis following insertion into the cleat assembly aperture 34. This feature reduces the likelihood that the cover device will accidentally disengage from the cleat assembly aperture when the user is walking about on the ground.

The channel 32 of the cover device 10 further comprises a first leg 36 adjacent to the cutout 30, a protuberance 38, a second leg 40, and a stop 42. The protuberance of the channel is located between the first leg and the second leg of the channel and extends radially outwardly. The protuberance is sized and configured to frictionally engage one of the spring clip's radially inwardly extending tongues 70 or 72. The second leg of the channel terminates at the stop and has a circumferential length configured to receive one of the spring clip's radially inwardly extending tongues 70 or 72. The protuberance is adapted to allow the one of the spring clip's tongues to snap into or out of the second leg of the channel upon application of sufficient torque to the cleat assembly cover device to overcome the frictional engagement between the protuberance and the spring clip's tongue.

The collar 20 of this preferred embodiment has four segments 80, 82, 84 and 86 of equal circumferential length, each segment having two adjacent segments and one non-adjacent segment. The non-adjacent segments of the collar have substantially identical curved top surfaces, whereas the adjacent segments of the collar have curved top surfaces that are complementary to one another. As a result, the device cover can mate with an identical second device cover that has been offset by a ninety-degree angle (best illustrated in FIGS. 2, 3).

The actuator 16 of the cleat assembly cover device 10 further includes a first actuator protrusion 44 having a bottom end 46 joined to the top surface of the bottom portion 22 of the cover device and a terminal end 48 opposite the bottom end, and a second actuator protrusion 50 also having its bottom end 52 joined to the top surface of the bottom portion 22 of the cover device, and a terminal end 54 opposite the bottom end. The first and second actuator protrusions extend axially such that the terminal ends of the first and second actuator protrusions project beyond at least a portion of the collar 20 (best illustrated in FIGS. 2 and 3).

Figure 5A:
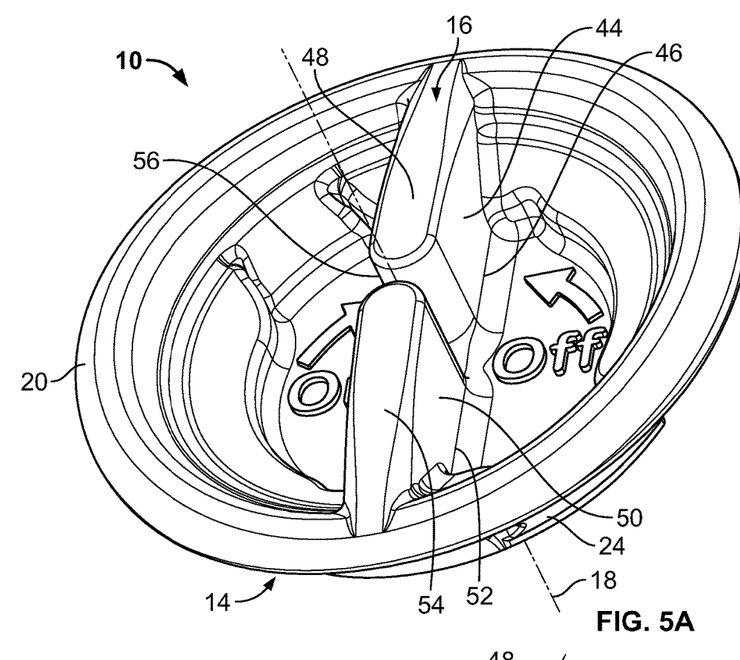
FIGS. 5A and 5B show perspective views of the embodiment of the cover device of FIG. 1.
Figure 5B:
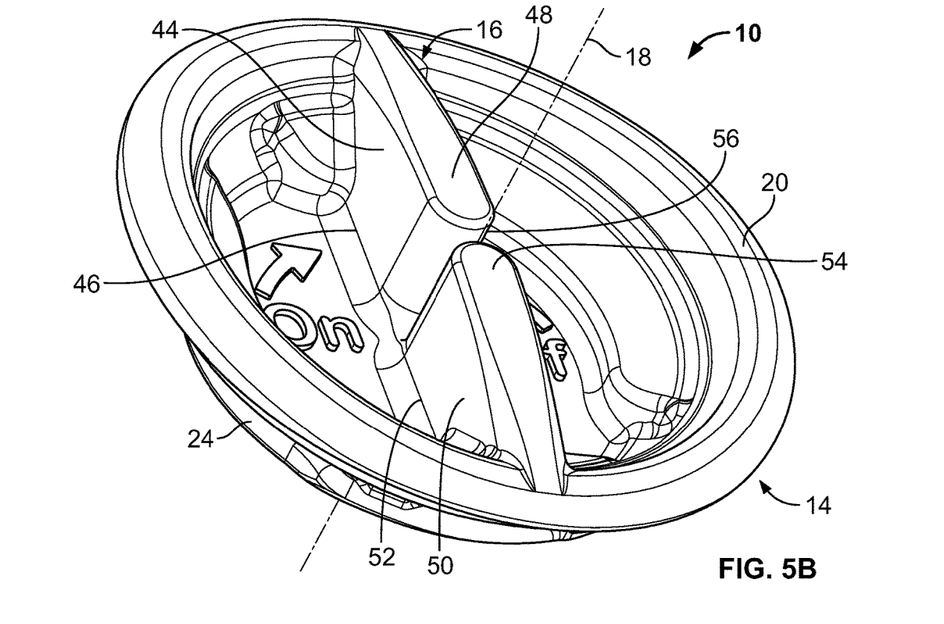

More particularly, the terminal ends 48 and 54 of the first and second actuator protrusions 44, 50 of the actuator 16 are spaced from one another a distance 56 (best illustrated in FIGS. 5A, 5B). The space between the first and second actuator protrusions can receive the terminal ends 48', 54' of first and second actuator protrusions 44', 50' of an identical second cleat assembly cover device 10', the two pairs of actuator protrusions contacting and frictionally retaining each other in a closed orientation resulting in the proximal end 20 of the first cleat assembly cover device 10 being substantially in contact with the proximal end 20' of the second cleat assembly cover device 10' (best illustrated in FIGS. 7, 8).

Although the invention has been described in detail with reference only to the presently preferred embodiments, those skilled in the art will appreciate that various modifications can be made without departing from the invention. Accordingly, the invention is defined only by the following claims.

I claim:

1. A bicycle cleat cover device comprising:
a bottom portion;
a collar spaced from the bottom portion along an axis;
a sidewall extending from the bottom portion to the collar; and
a pair of protrusions;
wherein the collar extends radially outward beyond the sidewall to form a continuous lip;
wherein a channel is formed in the sidewall;
wherein the channel starts at a cutout formed at an intersection of the sidewall and the bottom portion;
wherein a portion of the channel extends circumferentially from the cutout about a portion of the sidewall;
wherein the portion of the channel extending circumferentially is spaced from the bottom portion and comprises
a first leg adjacent to the cutout, and
a second leg that terminates at a stop;
wherein a protuberance is formed in the portion of the channel extending circumferentially, between the first leg and the second leg;
wherein each of the pair of protrusions has a top portion that extends axially from the bottom portion past the lip;
wherein the top portion of one protrusion of the pair of protrusions is separated from the top portion of the other of the pair of protrusions by a gap;
wherein the gap is sized to permit the pair of protrusions to frictionally retain a second pair of protrusions of a substantially identical second bicycle cleat cover device that has been offset by a ninety-degree angle; and
wherein the sidewall has a beveled outer surface tapering toward the bottom portion.

2. The bicycle cleat cover device of claim 1, wherein:
the collar has four segments of equal circumferential length, the four segments comprising a first segment, a second segment, a third segment, and a fourth segment;
the first segment is adjacent to the second and fourth segments and non-adjacent to the third segment;
the first and third segments of the collar have substantially identical curved top surfaces;
the first and second segments of the collar have curved top surfaces that are complementary; and
the first and fourth segments of the collar have curved top surfaces that are complementary.

3. The bicycle cleat cover device of claim 1, wherein the protuberance extends radially outward within the channel.

* * * * *